(12) United States Patent
McKinster

(10) Patent No.: US 11,680,784 B2
(45) Date of Patent: *Jun. 20, 2023

(54) TAPE MEASURE WITH FLUID-BASED RETRACTION SPEED CONTROLLER

(71) Applicant: Milwaukee Electric Tool Corporation, Brookfield, WI (US)

(72) Inventor: Scott Earl McKinster, Watertown, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 121 days.

This patent is subject to a terminal disclaimer.

(21) Appl. No.: 17/244,345

(22) Filed: Apr. 29, 2021

(65) Prior Publication Data
US 2021/0247170 A1 Aug. 12, 2021

Related U.S. Application Data

(63) Continuation of application No. 15/928,954, filed on Mar. 22, 2018, now Pat. No. 11,022,417, which is a
(Continued)

(51) Int. Cl.
*G01B 3/1005* (2020.01)
*G01B 3/102* (2020.01)
(Continued)

(52) U.S. Cl.
CPC ............ *G01B 3/1005* (2013.01); *G01B 3/102* (2020.01); *G01B 3/1003* (2020.01);
(Continued)

(58) Field of Classification Search
None
See application file for complete search history.

(56) References Cited

U.S. PATENT DOCUMENTS

| 1,945,842 A | 2/1934 | Witchger |
| 2,080,815 A | 5/1937 | Gasstrom |

(Continued)

FOREIGN PATENT DOCUMENTS

| EP | 2562510 | 2/2013 |
| JP | 2013-137280 | 7/2013 |

(Continued)

OTHER PUBLICATIONS

International Search Report and Written Opinion for International Application No. PCT/US2018/023602 dated Jul. 11, 2018, 15 pages.

*Primary Examiner* — Christopher W Fulton
(74) *Attorney, Agent, or Firm* — Reinhart Boerner Van Deuren s.c.

(57) ABSTRACT

A tool, such as a tape measure, including a spring-based retraction system is shown. The tape measure includes a fluid-based retraction speed controller. The speed controller may be formed from a rotor/stator arrangement. The rotor is coupled to the reel and the stator is coupled to the housing opposing the rotor. The rotor converts some rotational energy from tape reel into movement of a fluid (e.g., movement of air, movement of oil, etc. through friction) which acts to slow or limit the retraction/rotational speed of the reel as the retraction spring expands driving the reel during tape blade retraction.

22 Claims, 5 Drawing Sheets

Related U.S. Application Data continuation of application No. PCT/US2018/023602, filed on Mar. 21, 2018.

(60) Provisional application No. 62/476,354, filed on Mar. 24, 2017.

(51) Int. Cl.
    *G01B 3/1041*     (2020.01)
    *G01B 3/1003*     (2020.01)
    *G01B 3/1043*     (2020.01)

(52) U.S. Cl.
    CPC .......... *G01B 3/1041* (2013.01); *G01B 3/1043* (2020.01); *G01B 2003/103* (2013.01); *G01B 2003/1023* (2013.01)

(56) References Cited

U.S. PATENT DOCUMENTS

| | | |
|---|---|---|
| 2,904,282 A | 9/1959 | Zelnick |
| 3,098,622 A | 7/1963 | Bishop et al. |
| 3,889,897 A | 6/1975 | Van Zelderen |
| 4,043,434 A | 8/1977 | Braschler |
| 4,067,545 A | 1/1978 | Singer |
| 4,446,884 A | 5/1984 | Rader, Jr. |
| 4,687,155 A | 8/1987 | Burton |
| 4,907,756 A | 3/1990 | Bourrat |
| 5,624,085 A | 4/1997 | Usami |
| 5,657,551 A | 8/1997 | Lin |
| 5,794,878 A | 8/1998 | Carpenter et al. |
| 5,829,154 A | 11/1998 | Lin |
| 6,086,007 A | 7/2000 | Till |
| 6,662,463 B2 | 12/2003 | Lee |
| 7,370,432 B2 | 5/2008 | DuBois |
| 7,451,552 B2 * | 11/2008 | Haglof ............ G01B 3/12 33/767 |
| 7,559,154 B2 | 7/2009 | Levine et al. |
| 8,056,849 B2 | 11/2011 | Ng et al. |
| 8,215,027 B2 | 7/2012 | Kang |
| 8,429,830 B2 | 4/2013 | Kang |
| 11,022,417 B2 * | 6/2021 | McKinster ........... G01B 3/1005 |
| 11,226,187 B2 * | 1/2022 | Vitas .................... G01B 3/1005 |
| 11,408,718 B2 * | 8/2022 | McKinster ............. G01B 3/102 |
| 11,466,969 B2 * | 10/2022 | Mueckl ................ G01B 3/1005 |
| 2002/0004993 A1 | 1/2002 | Usami |
| 2004/0035971 A1 | 2/2004 | Li |
| 2004/0118002 A1 | 6/2004 | Lu |
| 2005/0191107 A1 | 9/2005 | Christie |
| 2007/0056182 A1 | 3/2007 | Di Bitonto |
| 2008/0120863 A1 | 5/2008 | Haglof |
| 2008/0263886 A1 | 10/2008 | Kang |
| 2012/0055740 A1 | 3/2012 | Allington |
| 2012/0087820 A1 | 4/2012 | Patterson |
| 2012/0167403 A1 | 7/2012 | Roeske |
| 2012/0298784 A1 | 11/2012 | Moroan et al. |
| 2014/0117136 A2 | 5/2014 | Morgan et al. |

FOREIGN PATENT DOCUMENTS

| | | |
|---|---|---|
| TW | M411558 U | 9/2011 |
| TW | 1532975 B | 5/2016 |
| TW | 1644079 B | 12/2018 |
| WO | WO 2011/072337 | 6/2011 |
| WO | WO 2011/132948 | 10/2011 |

* cited by examiner

TAPE MEASURE WITH FLUID-BASED RETRACTION SPEED CONTROLLER

CROSS-REFERENCE TO RELATED PATENT APPLICATIONS

The present application is a continuation of U.S. application Ser. No. 15/928,954, now U.S. Pat. No. 11,022,417, filed on Mar. 22, 2018, which is a continuation of International Application No. PCT/US2018/023602, filed Mar. 21, 2018, which claims the benefit of and priority to U.S. Provisional Application No. 62/476,354, filed on Mar. 24, 2017, which are incorporated herein by reference in their entireties.

BACKGROUND OF THE INVENTION

The present invention relates generally to the field of tools. The present invention relates specifically to a tape measure, measuring tape, retractable rule, etc., that includes a spring-based retraction system having a fluid-based retraction speed control.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned storing energy as the tape is extended and that releases energy to spin the reel, winding the blade back onto the reel.

SUMMARY OF THE INVENTION

One embodiment of the invention relates to a tape measure with a spring-based retraction system including a reel and a spring. The spring is coupled between a tape blade (or reel) and the tape measure housing such that the spring stores energy when the tape blade is extended from the housing and releases energy driving retraction of the tape blade into a wound position on the reel. The tape measure includes a speed control device including at least one vane coupled to the reel that converts rotational energy of the reel to movement of a fluid (e.g., air), causing a decrease in the rotational speed of the reel.

In one embodiment, the speed control device is configured such that the amount of rotational energy of the reel that is converted to fluid movement increases as the rotational speed of the reel increases. In one embodiment, the speed control device includes a rotor having a plurality of radially extending vanes rigidly coupled to the reel such that the rotor spins about a rotation axis along with the reel during tape retraction. In one embodiment, the speed control device also includes a stator having a plurality of radially extending vanes rigidly coupled to an inner surface of a tape measure housing opposing the rotor.

Another embodiment of the invention relates to a tape measure including a housing and a tape reel rotatably mounted within the housing defining an axis of rotation. The tape reel includes a radially outward facing surface. The tape measure includes an elongate tape blade wound around the radially outward facing surface of the tape reel. The tape measure includes a spring-based retraction system including a spring coupled to the tape reel. When the elongate tape blade is unwound from the tape reel to extend from the housing, the spring stores energy, and the spring releases energy driving rewinding of the elongate tape blade on to the tape reel. The tape measure includes a rotor comprising a vane rigidly coupled to the tape reel such that the rotor spins along with the tape reel during retraction of the elongate tape blade.

Another embodiment of the invention relates to a tape measure including a housing and a tape reel rotatably mounted within the housing defining an axis of rotation. The tape reel includes a radially outward facing surface. The tape measure includes an elongate tape blade wound around the radially outward facing surface of the tape reel. The tape measure includes a spring-based retraction system including a spring coupled to the tape reel. When the elongate tape blade is unwound from the tape reel to extend from the housing, the spring stores energy, and the spring releases energy driving rotation of the tape reel and rewinding of the elongate tape blade on to the tape reel. The tape measure includes a speed control device coupled to the tape reel, and the speed control device converts rotational energy of the reel to movement of a fluid within the housing.

Another embodiment of the invention relates to a tape measure including a housing and a tape reel rotatably mounted within the housing defining an axis of rotation. The tape reel includes a radially outward facing surface. The tape measure includes an elongate tape blade wound around the radially outward facing surface of the tape reel. The tape measure includes a spring-based retraction system including a spring coupled to the tape reel. When the elongate tape blade is unwound from the tape reel to extend from the housing, the spring stores energy, and the spring releases energy driving rewinding of the elongate tape blade on to the tape reel. The tape measure includes a speed control device. The speed control device includes a rotor rigidly coupled to the tape reel such that the rotor spins along with the tape reel during extension and retraction of the elongate blade and a stator non-rotationally fixed within the housing and opposing the rotor.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

DETAILED DESCRIPTION

Figure 1:
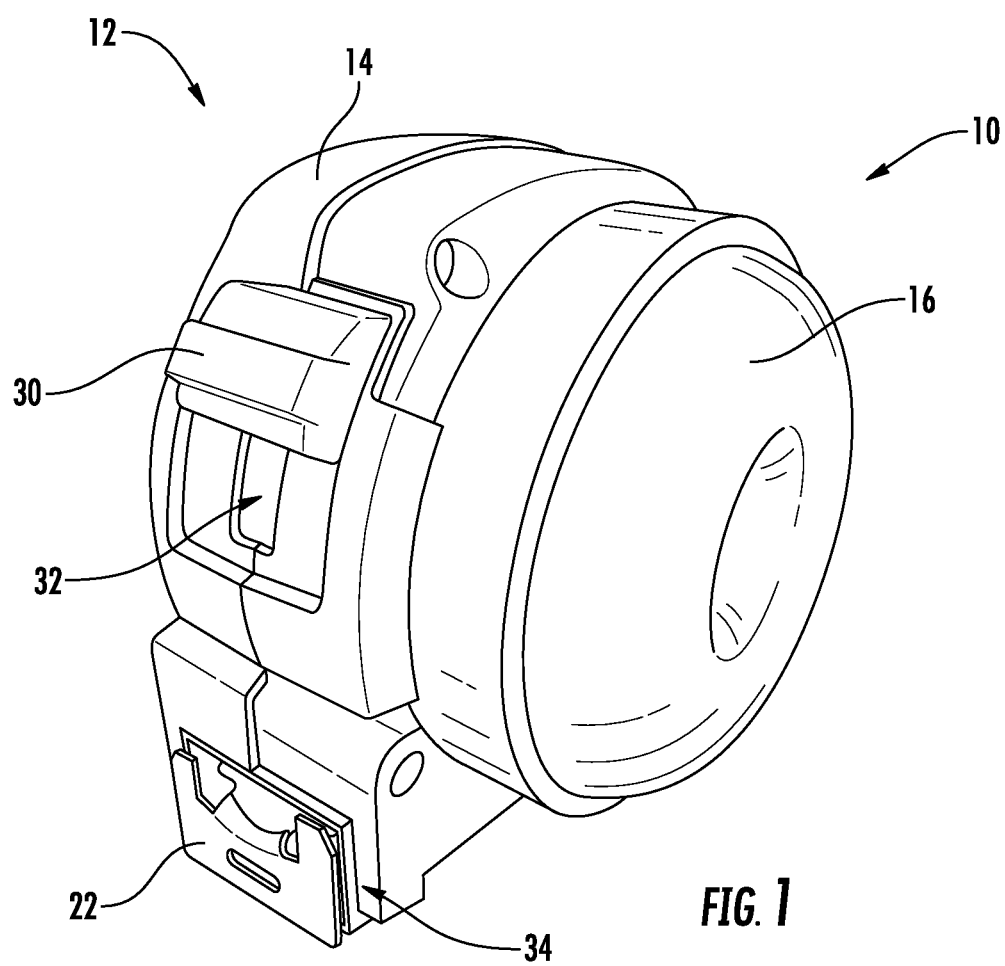
FIG. 1 is a perspective view of a tape measure including a retraction control system, according to an exemplary embodiment.

Referring generally to the figures, various embodiments of a tape measure are shown. Various embodiments of the tape measure discussed herein include an innovative retraction system designed to provide for a variety of desired retraction characteristics, including controlled/reduced retraction speed. Some tape measure blades are susceptible to damage/breakage due to high speed during retraction. For example, high speeds during retraction may cause the tape blade to whip (e.g., the tendency of the tape measure blade to bend or snap back on itself during fast retraction), which can crack or tear the tape blade, and similarly, high retraction speeds can damage the tape blade when the tape hook contacts the tape housing at the end of retraction. Applicant believes that the retraction speed control provided by the tape measure discussed herein can limit such sources of tape measure damage.

As will generally be understood, in certain tape measure designs, a spring stores energy during tape blade extension and applies a force/torque to a reel causing the tape blade to wind on to the reel during tape blade retraction. Various aspects of spring design, such as spring energy, torque profile, spring constant, etc., are selected to ensure that operation of the spring has enough energy to provide satisfactory tape retraction. However, because of the physics and characteristics of the typical tape measure spiral spring, in order to ensure full tape retraction at a satisfactory speed, the typical tape measure spiral spring delivers excess energy to the tape blade during retraction, which in turn translates into undesirably highly retraction speeds and whip, particularly toward the end of retraction.

As discussed herein, Applicant has developed a tape measure blade retraction system that includes a retraction speed controller. In particular, the retraction speed controller discussed herein transfers rotational energy from the tape reel during retraction to a fluid (e.g., air, oil, etc.) via friction/drag, which in turn acts to decrease retraction speed. In particular embodiments, the retraction speed controller utilizes a rotor structure with vanes coupled to the tape reel and the rotor faces opposing vanes on a stator structure formed along the inner surface of the tape measure housing opposing the rotor. During retraction, the rotor/stator configuration transfers some of the rotational energy from the tape reel to the fluid because the vanes of the rotor are shaped and positioned relative to the axis of reel rotation such that they tend to move air/fluid around the curved, toroidal shaped inner surface of the rotor and stator. This energy transfer tends to slow down the reel and hence retraction speed.

Applicant believes that use of the fluid-based speed controller discussed herein provides a variety of improvements relative to some other approaches to controlling retraction speed that may be considered. Importantly, the nature of the fluid-based retraction speed control system discussed herein causes increased braking as the speed of the reel increases. Specifically, the amount of rotational energy that the rotor/stator arrangement transfers to the fluid is directly related to the rotational speed of the reel and, as such, the amount of breaking increases as the speed of the reel increases. Thus, Applicant believes that the fluid retraction control system discussed herein provides an advantage in that it has a relatively low impact on the initial relatively low speed acceleration phase of tape retraction while having a greater braking effect when the reel reaches high speeds. This relationship allows the fluid-based retraction control system to have its largest speed reduction effect targeted to the time period when speed reduction is most needed (i.e., at high speeds where whip and other sources of tape damage are more likely) while not having significant effect during initial acceleration phases of tape retraction. In addition, in contrast to physical, contact, friction-based breaking systems, for example, the fluid-based retraction speed control system discussed herein is believed to experience less wear and longer life span due to the no-contact nature of energy transfer from the reel to the fluid.

Figure 2:
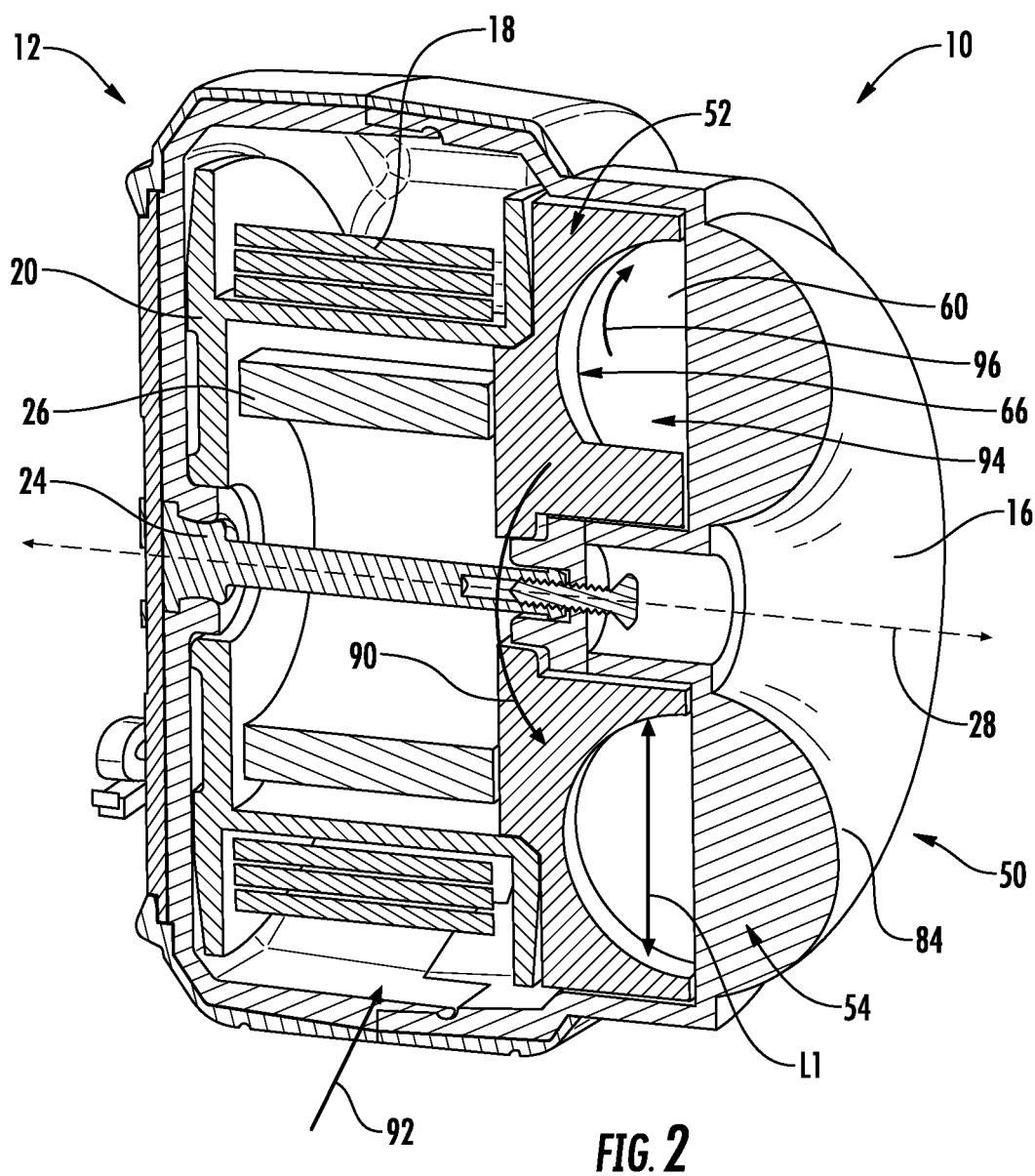
FIG. 2 is a cross-sectional perspective view of the tape measure of FIG. 1, according to an exemplary embodiment.

Referring to FIGS. 1 and 2, a length measurement device, tape measure, measuring tape, retractable rule, etc., such as tape measure 10, is shown according to an exemplary embodiment. In general, tape measure 10 includes a housing 12 having a first part 14 and a second part 16. Tape measure 10 includes a tape blade 18 and, in the retracted position shown in FIGS. 1 and 2, tape blade 18 is wound or coiled onto a tape reel 20. In general, tape blade 18 is an elongated strip of material including a plurality of graduated measurement markings, and in specific embodiments, tape blade 18 is an elongated strip of metal material (e.g., steel material) that includes an outer most end coupled to a hook assembly 22. Tape blade 18 may include various coatings (e.g., polymer coating layers) to help protect tape blade 18 and/or the graduated markings of the blade from wear, breakage, etc. In various embodiments, tape blade 18 has a maximum length that may be extended from the housing of between 10 ft. and 50 ft.

In general, tape reel 20 is rotatably mounted to an axle or post 24 that is supported from housing 12. In one embodiment, post 24 is rigidly connected (i.e., rotationally fixed) relative to housing 12, and in another embodiment, post 24 is rotatably connected to housing 12 such that post 24 is allowed to rotate relative to housing 12 during tape extension or retraction.

Tape measure 10 includes a retraction system that includes a spring, shown as spiral spring 26. In general, spiral spring 26 is coupled between post 24 and tape 18 (or tape reel 20) such that spiral spring 26 is coiled or wound to store energy during extension of tape 18 from housing 12 and is unwound, releasing energy, driving rewinding of tape 18 onto tape reel 20 during retraction of tape 18 (e.g., following release or unlocking of the tape 18). Specifically, when tape blade 18 is unlocked or released, spring 26 expands, driving tape reel 20 to wind up tape blade 18 and to pull tape blade 18 back into housing 12.

As shown in FIG. 2, the non-extended portion of tape 18 is wound onto a reel 20, which is surrounded by housing 12. Reel 20 is rotatably disposed about an axis 28 of tape measure 10, and spring 26 is coupled to reel 20 and configured to drive reel 20 about rotation axis 28, which in turn provides powered retraction of tape blade 18. Referring to FIG. 1, a tape lock 30 is provided to selectively engage tape blade 18, which acts to hold tape blade 18 and reel 20 in place such that an extended segment of tape blade 18 remains at a desired length.

A slot 32 is defined along a forward portion of housing 12. Slot 32 provides an opening in the tape measure housing 12 which allows tape lock 30 to extend into housing 12 and to engage with tape 18 or reel 20. In addition, slot 32 provides a length sufficient to allow tape lock 30 to be moved relative to housing 12 between locked and unlocked positions.

Below slot 32, a tape port 34 is provided in tape housing 12. In one embodiment, tape port 34 has an arcuate shape, corresponding to an arcuate cross-sectional profile of tape blade 18. Tape port 34 allows for the retraction and extension of tape blade 18 into and from housing 12 during tape extension and retraction.

Referring generally to FIGS. 2-5, tape measure 10 includes a retraction speed control device, shown as speed controller 50. In general, speed controller 50 is a fluid-based speed control device configured to convert some rotational energy from reel 20 into movement of a fluid (e.g., movement of air, movement of oil, etc., through friction) which acts to slow or limit the retraction/rotational speed of reel 20 as spring 26 expands during tape blade retraction. In specific embodiments, speed controller 50 is configured such that the amount of rotational energy of reel 20 that is converted to fluid movement (which is related to the amount of braking provided by speed controller 50) is directly related to the rotational speed of reel 20. Thus, as spring 26 accelerates reel 20 to higher rotational speeds, the damping effect of speed controller 50 increases.

Figure 3:
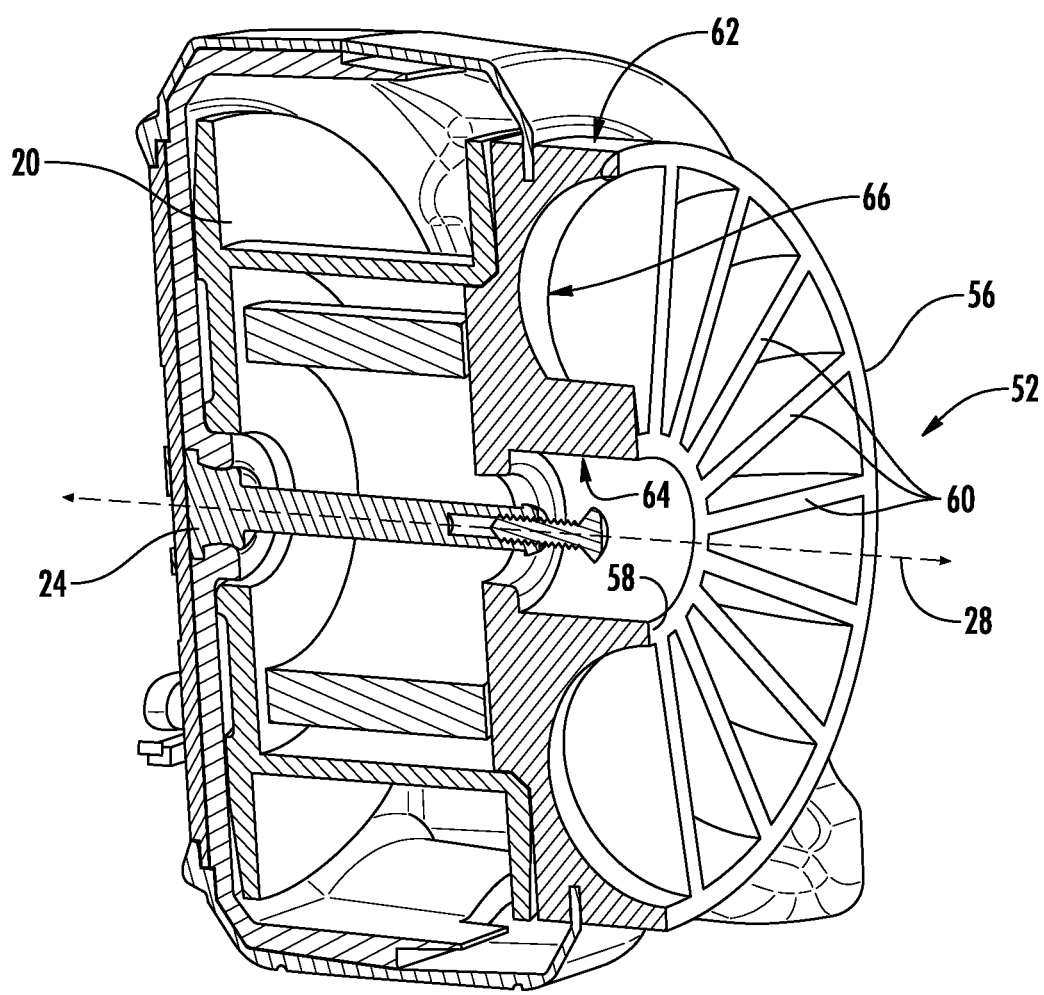
FIG. 3 is a cross-sectional perspective view of the tape measure of FIG. 1 with an outer cover removed showing a rotor of the retraction speed control system, according to an exemplary embodiment.
Figure 4:
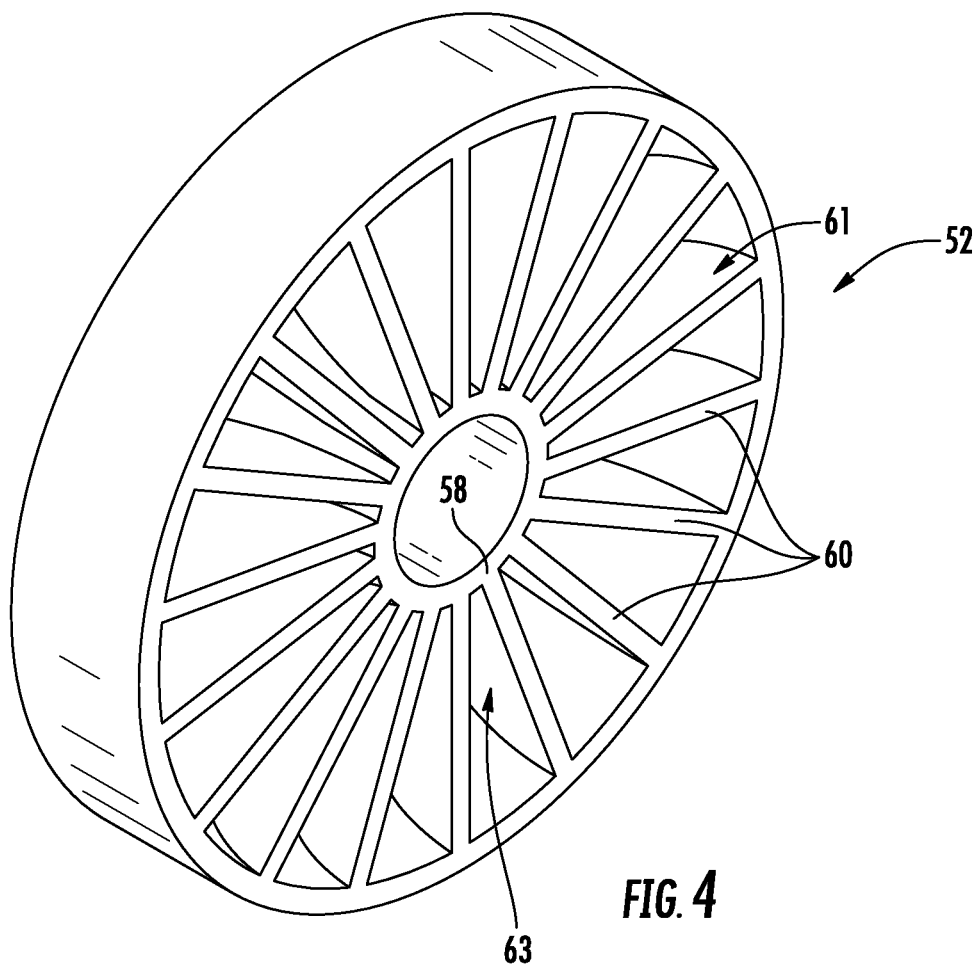
FIG. 4 is a perspective view of a rotor for a retraction speed control system, according to an exemplary embodiment.
Figure 5:
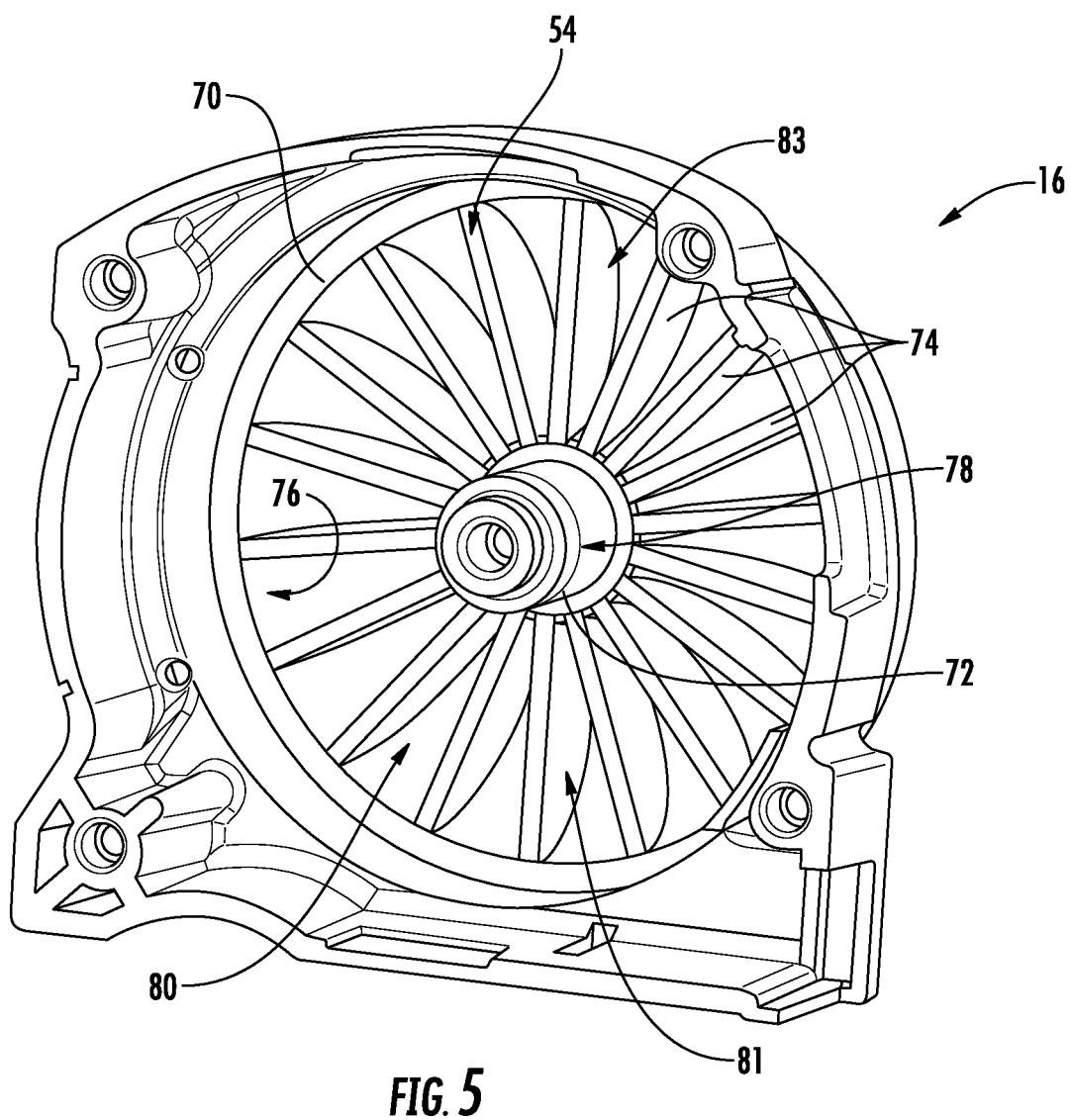
FIG. 5 is a perspective view of a portion of a tape measure housing including a stator of a retraction speed control system, according to an exemplary embodiment.

In specific embodiments as shown in FIGS. 2-5, speed controller 50 includes a rotor 52 and an opposing stator 54. Rotor 52 is rigidly fixed to tape reel 20 such that rotor 52 spins with tape reel 20 when tape reel 20 is driven by spring 26 during retraction. Referring to FIGS. 2 and 5, stator 54 is positioned along the inner surface of second housing piece 16 facing/opposing rotor 52. Stator 54 has a structure and arrangement similar to rotor 52 except that stator 54 is rotationally fixed, and rotor 52 is permitted to spin about axis 28 relative to stator 54.

Referring to FIGS. 3 and 4, rotor 52 includes an outer wall 56 and an inner wall 58. Rotor 52 includes a plurality of radially extending walls or vanes 60 that extend in the radial direction from inner wall 58 to outer wall 56. As shown best in FIG. 4, each vane 60 includes a first major surface 61 having a width parallel to the axis of rotation 28 and facing in the counterclockwise direction and second major surface 63 having a width parallel to the axis of rotation 28 and facing in the clockwise direction. In specific embodiments, surfaces 61 and 63 are planar surfaces, and in even more specific embodiments, surfaces 61 and 63 are planar surfaces that are parallel to each other. As used herein clockwise and counterclockwise direction refer to a reference frame relative to the axis of rotation.

In the specific embodiment shown, outer wall 56 defines a cylindrical outer surface 62 and has an outer diameter that is about the same (e.g., within 5% of each other) as the outer diameter of reel 20. Inner wall 58 defines a cylindrical inner surface 64. Both outer surface 62 and inner surface 64 are coaxial with rotational axis 28 and axle 24, and vanes 60 extend radially in relation to rotational axis 28 and axle 24.

Rotor 52 includes curved surfaces 66 located between each adjacent pair of vanes 60. In general, each curved surface 66 is a concave surface that faces outward away from reel 20 in the direction of rotational axis 28 and that has a longitudinal or major axis that is oriented in the radial direction relative to rotational axis 28. In various embodiments, each curved surface 66 is a continuously curved surface that extends in the radial direction between inner wall 58 and outer wall 56. In specific embodiments, curved surfaces 66 are semicircular surfaces sweeping out in a 180-degree arc.

Referring to FIGS. 2 and 5, stator 54 includes an outer wall 70 and an inner wall 72. Stator 54 includes a plurality of radially extending walls or vanes 74 that extend in the radial direction from inner wall 72 to outer wall 70. As shown best in FIG. 5, each vane 74 includes a first major surface 81 having a width parallel to the axis of rotation 28 and facing in the counterclockwise direction and second major surface 83 having a width parallel to the axis of rotation 28 and facing in the clockwise direction. In specific embodiments, surfaces 81 and 83 are planar surfaces, and in even more specific embodiments, surfaces 81 and 83 are planar surfaces that are parallel to each other. In the specific embodiment shown, outer wall 70 defines a cylindrical radially inward facing surface 76 and has an outer diameter that is about the same (e.g., within about 5%) as the outer diameter of rotor 52. Inner wall 72 defines a cylindrical outer surface 78. Both surface 76 and surface 78 are coaxial with rotational axis 28 and axle 24 when housing piece 16 is coupled to housing piece 14, and vanes 74 extend radially in relation to rotational axis 28 and axle 24.

Stator 54 includes curved surfaces 80 located between each adjacent pair of vanes 74. In general, each curved surface 80 is a concave surface that faces inward toward reel 20 in the direction of rotational axis 28 and that has a longitudinal or major axis that is oriented in the radial direction relative to rotational axis 28. In various embodiments, each curved surface 80 is a continuously curved surface that extends in the radial direction between wall 70 and wall 72. In specific embodiments, curved surfaces 80 are semicircular surfaces sweeping out in a 180 degree arc. As shown best in FIG. 2, second housing part 16 includes an outer surface 84 and stators 54 are located within outer surface 84.

Referring to FIG. 2, speed control during reel retraction via speed controller 50 is shown and described in more detail. During retraction, spring 26 drives reel 20 to rotate in the direction of arrow 90 about rotation axis 28, which causes tape blade 18 to retract in the direction of arrow 92. Driving reel 20 to rotate in the direction of arrow 90 causes rotor 52 to rotate relative to stator 54.

This rotational movement of rotor 52 drives the circumferentially facing surfaces 94 of each vane 60 through the fluid (e.g., air in one exemplary embodiment). The interaction with surfaces 94 and the air during rotation of rotor 52 imparts motion to the air, which then flows along curved surfaces 66 in the direction of arrow 96 and toward stator 54. Within stator 54, the moving air interacts with fixed vanes 74 such that at least some of the energy of the moving air is absorbed via friction by stator 54. In this manner, the rotor/stator arrangement of speed controller 50 acts to dissipate at least some of the rotational energy of reel 20, which in turn acts to limit or decrease the maximum rotational speed of reel 20 during tape retraction.

As will be understood, because the amount of interaction between surfaces 94 of rotor vanes 60 and the air is related to the rotational speed of reel 20, the amount of energy absorbed by speed controller 50 is directly related to the speed of reel 20. Thus, speed controller 50 provides an automatic control of rotational speed of reel 20 that is increased as reel speed is increased, which is when such control is most needed to limit damage to tape measure blade 18 or hook assembly 22.

In particular embodiments, vanes 60 and/or 74 are sized and/or positioned to provide the desired level of energy dissipation/braking to reel 20. For example, as shown in FIGS. 2 and 5, each vane 60 has a radial length L1, and each vane 74 has a radial length L2. In the embodiment shown, because vanes 60 and 74 are generally semicircular in shape, L1 and L2 are diameters of the circumferentially facing surfaces (e.g., surfaces 94 of vanes 60). In specific embodiments, the size of vanes 60 and/or 74 relates to the amount of energy dissipation provided by speed control 50. In specific embodiments, L1 and/or L2 are between 50% and 150% of the width of tape blade 18. In specific embodiments, L1 and/or L2 are between 0.5 and 2 inches.

It should be understood that while FIGS. 1-5 show a particular stator/rotor arrangement, a variety of similar fluid-based speed controller arrangements could be used. For example, in some embodiments, vanes 60 and 74 may be curved wall structures having a curved surface facing in the circumferential direction. Similarly, while Applicant understands the 180-degree arc of surfaces 66 and 80 to be particularly efficient at moving air within the rotor/stator arrangement, surface 66 and/or surface 80 may have arc lengths greater or less than 180 degrees. In addition, while in the embodiments discussed above air is the primary fluid described as being driven between rotor 52 and stator 54, in other embodiments, a liquid fluid, such as oil, may be located within the rotor/stator arrangement.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
    a housing comprising:
        a first housing piece;
        a second housing piece coupled to the first housing piece, the second housing piece including an outer surface having a concave shape;
    a tape reel rotatably mounted within the first housing piece defining an axis of rotation, the tape reel comprising a radially outward facing surface;
    an elongate tape blade coiled around the tape reel;
    a retraction system, the retraction system comprising:
        a spring coupled to the tape reel, wherein the elongate tape blade is uncoiled from the tape reel to extend from the housing; and
    a speed control device comprising:
        a rotor, the rotor coupled to the tape reel such that the rotor spins along with the tape reel during retraction of the elongate tape blade; and
        a stator, the stator located within the outer surface of the second housing piece opposing the rotor.

2. The tape measure of claim 1, wherein the rotor is adjacent to the tape reel along the axis of rotation such that the rotor is positioned between the tape reel and an inner surface of the second housing piece, and the stator is coupled to the inner surface of the second housing piece.

3. The tape measure of claim 1, further comprising an axle, wherein the axle is rotationally fixed relative to the housing.

4. The tape measure of claim 1, wherein the rotor further comprises an outer wall defining a cylindrical outer surface, wherein the cylindrical outer surface is coaxial with the axis of rotation.

5. The tape measure of claim 1, wherein the rotor includes a plurality of vanes each extending in a radial direction away from the axis of rotation, wherein each of the plurality of vanes of the rotor comprises:
    a first major surface having a width parallel to the axis of rotation and facing in a counterclockwise direction; and
    a second major surface having a width parallel to the axis of rotation and facing in a clockwise direction.

6. The tape measure of claim 5, wherein the rotor further comprises a plurality of concave surfaces located between each adjacent pair of vanes, wherein each concave surface faces outward away from the tape reel in a direction of the axis of rotation.

7. The tape measure of claim 1, wherein the stator includes a plurality of vanes each extending in a radial direction away from the axis of rotation, wherein each of the plurality of vanes of the stator comprises:
    a first major surface having a width parallel to the axis of rotation and facing in a counterclockwise direction; and
    a second major surface having a width parallel to the axis of rotation and facing in a clockwise direction.

8. The tape measure of claim 7, wherein the first major surface of the stator is a planar surface and the second major surface of the stator is a planar surface and wherein the first and second major surfaces of the stator are parallel to each other.

9. The tape measure of claim 7, wherein the stator further comprises a plurality of concave surfaces located between each adjacent pair of vanes, wherein each concave surface faces inward toward the tape reel in a direction of the axis of rotation.

10. A tape measure comprising:
a housing;
a tape reel rotatably mounted within the housing defining an axis of rotation;
an elongate tape blade coiled around the tape reel;
a spring-based retraction system comprising a spring coupled to the tape reel, wherein, when the elongate tape blade is uncoiled from the tape reel to extend from the housing, the spring stores energy, and the spring releases energy driving recoiling of the elongate tape blade on to the tape reel; and
a speed control device directly coupled to an outer surface of the tape reel, wherein the speed control device converts rotational energy of the tape reel to movement of a fluid within the housing.

11. The tape measure of claim 10, wherein the speed control device further comprises:
a rotor rigidly coupled to the tape reel such that the rotor spins along with the tape reel during extension and retraction of the elongate tape blade; and
a stator non-rotationally fixed within the housing and opposing the rotor.

12. The tape measure of claim 11, wherein the rotor includes a plurality of vanes each extending in a radial direction away from the axis of rotation, wherein each of the plurality of vanes of the rotor comprises:
a first major surface having a width parallel to the axis of rotation and facing in a counterclockwise direction; and
a second major surface having a width parallel to the axis of rotation and facing in a clockwise direction.

13. The tape measure of claim 11, wherein the stator includes a plurality of vanes each extending in a radial direction away from the axis of rotation, wherein each of the plurality of vanes of the stator comprises:
a first major surface having a width parallel to the axis of rotation and facing in a counterclockwise direction; and
a second major surface having a width parallel to the axis of rotation and facing in a clockwise direction.

14. The tape measure of claim 13, wherein the stator further comprises a plurality of curved surfaces located between each adjacent pair of vanes, wherein each concave surface faces inward toward the tape reel in a direction of the axis of rotation.

15. The tape measure of claim 10, wherein the speed control device is configured such that an amount of rotational energy of the tape reel that is converted to movement of the fluid increases as the rotational speed of the tape reel increases.

16. The tape measure of claim 10, wherein the fluid moved within the speed control device is at least one of air and oil.

17. The tape measure of claim 10, wherein the outer surface of the tape reel faces outward in a direction of the axis of rotation.

18. The tape measure of claim 10, wherein a portion of the speed control device is positioned adjacent to the tape reel and along the axis of rotation.

19. A tape measure comprising:
a housing;
a tape reel rotatably mounted within the housing defining an axis of rotation;
an elongate tape blade coiled around the tape reel;
a retraction system coupled to the tape reel, wherein, when the elongate tape blade is unwound from the tape reel to extend from the housing, the retraction system stores energy, and the retraction system releases energy driving rewinding of the elongate tape blade on to the tape reel; and
a speed control device comprising:
a rotor rigidly coupled to the tape reel such that the rotor spins along with the tape reel during retraction of the elongate tape blade; and
a stator non-rotationally fixed within the housing facing the rotor.

20. The tape measure of claim 19, wherein the retraction system includes a spring coupled between an axle and the tape reel such that the spring is wound to store energy when the elongate tape blade is extended from the housing and unwound to release energy when the elongate tape blade is retracted back into the housing.

21. The tape measure of claim 19, wherein the rotor further comprises a vane rigidly coupled to the tape reel, the vane extending in a radial direction away from the axis of rotation.

22. The tape measure of claim 21, wherein the rotor further comprises a second vane and a curved surface having a toroidal shape, the curved surface facing outward away from the tape reel in a direction of the axis of rotation.

* * * * *